(12) United States Patent
Eberlein et al.

(10) Patent No.: US 11,121,943 B2
(45) Date of Patent: Sep. 14, 2021

(54) AMPLIFYING SCALING ELASTICITY OF MICROSERVICE MESHES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 70 days.

(21) Appl. No.: 16/219,371

(22) Filed: Dec. 13, 2018

(65) Prior Publication Data

US 2020/0195526 A1  Jun. 18, 2020

(51) Int. Cl.
*H04L 12/24* (2006.01)
*G06F 9/50* (2006.01)

(52) U.S. Cl.
CPC .......... *H04L 41/5054* (2013.01); *G06F 9/505* (2013.01); *G06F 9/5077* (2013.01); *H04L 41/5025* (2013.01); *H04L 41/5035* (2013.01)

(58) Field of Classification Search
CPC ............. H04L 41/5054; H04L 41/5025; H04L 41/5035; G06F 9/505; G06F 9/5077; G06F 9/5061; G06F 9/5072
USPC ....................................................... 709/223
See application file for complete search history.

(56) References Cited

U.S. PATENT DOCUMENTS

| | | |
|---|---|---|
| 5,680,573 A | 10/1997 | Rubin et al. |
| 5,925,100 A | 7/1999 | Drewry et al. |
| 5,946,647 A | 8/1999 | Miller et al. |
| 6,055,569 A | 4/2000 | O'Brien et al. |
| 6,728,726 B1 | 4/2004 | Bernstein et al. |
| 6,996,680 B2 | 2/2006 | Mogi et al. |
| 7,284,096 B2 | 10/2007 | Schreter |
| 7,523,142 B2 | 4/2009 | Driesen et al. |
| 7,529,895 B2 | 5/2009 | Blumrich et al. |
| 7,558,822 B2 | 7/2009 | Fredricksen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,941,609 B2 | 5/2011 | Almog |
| 7,962,920 B2 | 6/2011 | Gabriel et al. |

(Continued)

OTHER PUBLICATIONS

U.S. Appl. No. 14/960,983, filed Dec. 7, 2015, Eberlein, et al.

(Continued)

*Primary Examiner* — David R Lazaro
*Assistant Examiner* — Zia Khurshid
(74) *Attorney, Agent, or Firm* — Fish & Richardson P.C.

(57) ABSTRACT

A mesh-type scaler is selected for performing overall mesh-wide scaling of a microservices mesh. The microservices mesh is scaled with the mesh-type scaler and one or more mesh scaling rules to generate a predicted value for a monitoring parameter of one or more monitoring parameters. A single-service-type scaler is selected. The monitoring parameter is measured with the single-service-type-scaler to generate a measured value. For an individual service associated with the microservices mesh, a target value is calculated for the monitoring parameter using the predicted value and the measured value. The target value is compared against a defined threshold to generate a scaling value used to determine if scaling is needed with respect to the individual service.

20 Claims, 5 Drawing Sheets

Application with three services, the service calls, and the OS monitoring

(56) References Cited

U.S. PATENT DOCUMENTS

| | | |
|---|---|---|
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,275,829 B2 | 9/2012 | Plamondon |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,326,830 B2 | 12/2012 | Hollingsworth |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,510,710 B2 | 8/2013 | Harren et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,577,960 B2 | 11/2013 | Boller et al. |
| 8,600,916 B2 | 12/2013 | Chen et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,436,724 B2 | 9/2016 | Driesen et al. |
| 9,724,757 B2 | 8/2017 | Barrett |
| 2004/0117398 A1 | 6/2004 | Idei et al. |
| 2006/0069715 A1 | 3/2006 | Vayssiere |
| 2006/0098253 A1 | 5/2006 | Masuno et al. |
| 2008/0120129 A1 | 5/2008 | Seubert et al. |
| 2010/0023925 A1 | 1/2010 | Shribman et al. |
| 2010/0153341 A1 | 6/2010 | Driesen et al. |
| 2012/0089664 A1 | 4/2012 | Igelka |
| 2012/0284080 A1 | 11/2012 | Oliveira et al. |
| 2013/0007259 A1 | 1/2013 | Pacheco-Sanchez et al. |
| 2013/0167079 A1 | 6/2013 | Ari et al. |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2015/0281113 A1* | 10/2015 | Siciliano ............. H04L 43/0817 709/226 |
| 2017/0025441 A1 | 1/2017 | Mori |
| 2017/0353541 A1 | 12/2017 | Higashi |
| 2017/0359217 A1* | 12/2017 | Ahuja ................... G06F 21/554 |
| 2018/0046477 A1 | 2/2018 | Aelken |
| 2018/0314616 A1* | 11/2018 | Savolainen ......... G06F 11/3442 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/167,746, filed May 27, 2016, Burkhardt et al.
U.S. Appl. No. 15/285,715, filed Oct. 5, 2016, Specht et al.
U.S. Appl. No. 15/285,745, filed Oct. 5, 2016, Mayer.
U.S. Appl. No. 15/356,190, filed Nov. 18, 2016, Eberlein.
U.S. Appl. No. 15/461,236, filed Mar. 16, 2017, Richter et al.
U.S. Appl. No. 15/581,459, filed Apr. 28, 2017, Eberlein, et al.
U.S. Appl. No. 15/593,830, filed May 12, 2017, Eberlein, et al.
U.S. Appl. No. 15/847,627, filed Dec. 19, 2017, de Boer, et al.
U.S. Appl. No. 15/970,499, filed May 3, 2018, Eberlein, et al.
U.S. Appl. No. 16/173,225, filed Oct. 29, 2018, Eberlein, et al.
U.S. Appl. No. 16/197,888, filed Nov. 21, 2018, Meissner et al.
Extended European Search Report issued in European Application No. 19205331.2 dated Mar. 27, 2020, 12 pages.
Fowley, "Chapter 4: Scalability and Performance", Production-Ready Microservices, 2016, 30 pages.
Thorpe, "Scaling Microservices: The Challenges and Solutions—Dzone Microservices", Aug. 14, 2018, [retrieved on Mar. 19, 2020], retrieved from: URL <URL:https://dzone.com/articles/scalingmicroservices-the-challenges-and-solutions>, 13 pages.

* cited by examiner

AMPLIFYING SCALING ELASTICITY OF MICROSERVICE MESHES

BACKGROUND

An application in a microservices architecture (for example, in a large-scale cloud-computing system deployment) will consume a set of services, of which the set of services can again consume another set of services (that is, the services form a "service mesh"). Applications and services can be scaled-out by adding more instances (and scaled-in by removing instances). A load balancer typically distributes calls between application and service instances, so the instances of each service typically have similar operating system usage.

A service (or microservice) mesh can be monitored with a monitoring infrastructure, which will regularly read operating system parameters (such as, central processing unit load, memory usage, network input/output, disk wait time, and block page-out). Upon a change in the usage load, a number of instances of services in the service mesh can be adjusted by a scaling component, based on information provided by the monitoring infrastructure. In this scenario: 1) If the usage load increases, instances need to be added, otherwise response time increases and service requests may be delayed or even rejected, which leads to a bad user experience or 2) if the usage load decreases, instances should be removed, otherwise operating resources are wasted and the overall resource consumption is higher than required, which leads to higher operating costs. These two requirements are in tension: 1) ensuring that there are enough instances to ensure efficient operation and user satisfaction, but 2) only as many instances as actually needed in order to operate at the lowest possible cost.

SUMMARY

The present disclosure describes amplifying scaling elasticity of microservice meshes.

In an implementation, a mesh-type scaler is selected for performing overall mesh-wide scaling of a microservices mesh. The microservices mesh is scaled with the mesh-type scaler and one or more mesh scaling rules to generate a predicted value for a monitoring parameter of one or more monitoring parameters. A single-service-type scaler is selected. The monitoring parameter is measured with the single-service-type-scaler to generate a measured value. For an individual service associated with the microservices mesh, a target value is calculated for the monitoring parameter using the predicted value and the measured value. The target value is compared against a defined threshold to generate a scaling value used to determine if scaling is needed with respect to the individual service.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, auto-scaling functionality is extended to be aware of service (or microservice) meshes and dependencies between the service meshes. Second, additional operating system parameters (such as, central processing unit load, memory usage, network input/output, disk wait time, and block page-out) are monitored and evaluated in the computation of a service mesh target size. The mesh target size is used to automatically speed up scale-out or scale-in in order to more quickly react in a changed demand situation to avoid slow response times. Third, the described methodology permits an optimum balance between ensuring that there are enough instances to ensure efficient operation and user satisfaction, but only as many instances as actually needed in order to operate at the lowest possible cost.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes amplifying scaling elasticity of microservice meshes, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A microservice architecture is a variant software development technique based on a service-oriented architecture (SOA) architectural style that structures an application as a collection of loosely coupled services. In a microservices architecture, services are fine-grained and protocols are lightweight. A service (or microservice) mesh (or "mesh") is a paradigm that provides containers and microservices-based applications with services that integrate directly from within a computing cluster. A service mesh provides monitoring, scalability, and high-availability services through application programming interfaces (APIs) instead of using discrete computing devices.

An application in a microservices architecture (for example, in a large-scale cloud-computing system deployment) will consume a set of services, of which the set of services can again consume another set of services (that is, the services form a "service mesh"). Applications and services can be scaled-out by adding more instances (and scaled-in by removing instances). A load balancer typically distributes calls between application and service instances, so the instances of each service typically have similar operating system usage.

A service mesh can be monitored with a monitoring infrastructure, which will regularly read operating system (OS) parameters (such as, central processing unit load, memory usage, network input/output, disk wait time, and block page-out). Upon a change in the usage load, a number of instances of services in the service mesh can be adjusted by a scaling component, based on information provided by the monitoring infrastructure. In this scenario: 1) If the usage load increases, instances need to be added, otherwise response time increases and service requests may be delayed or even rejected, which leads to a bad user experience or 2) if the usage load decreases, instances should be removed, otherwise operating resources are wasted and the overall resource consumption is higher than required, which leads to higher operating costs. These two requirements are in tension: 1) ensuring that there are enough instances to ensure efficient operation and user satisfaction, but 2) only as many instances as actually needed in order to operate at the lowest possible cost. The question is how to operate the service mesh with as few hardware resources as possible and still maintain fast response times and high user satisfaction. This is because the smaller the number of instances used for a typical usage load (less operation costs), the faster auto-scaling needs to react to scale-out to a higher demand. Similarly, the faster the auto-scaling can identify lower usage and scale-down, the lower the resource usage and operational costs.

Described is an auto-scaling methodology for use in a microservices architecture for large-scale cloud-computing deployments. For example, in a single-application client-server architecture, scaling using additional instances immediately leads to higher throughput, if more requests need to be processed. Scaling is typically triggered by a higher load of a set of instances for one service type, then, more instances for this service type are started. However, in a microservices architecture, there can be a time lag between the initial scale-out of the application instances and actual higher throughput, since not only the application instances need to be scaled-out, but also the instances of the services used by the application and further services used by the services used by the application.

Figure 1:
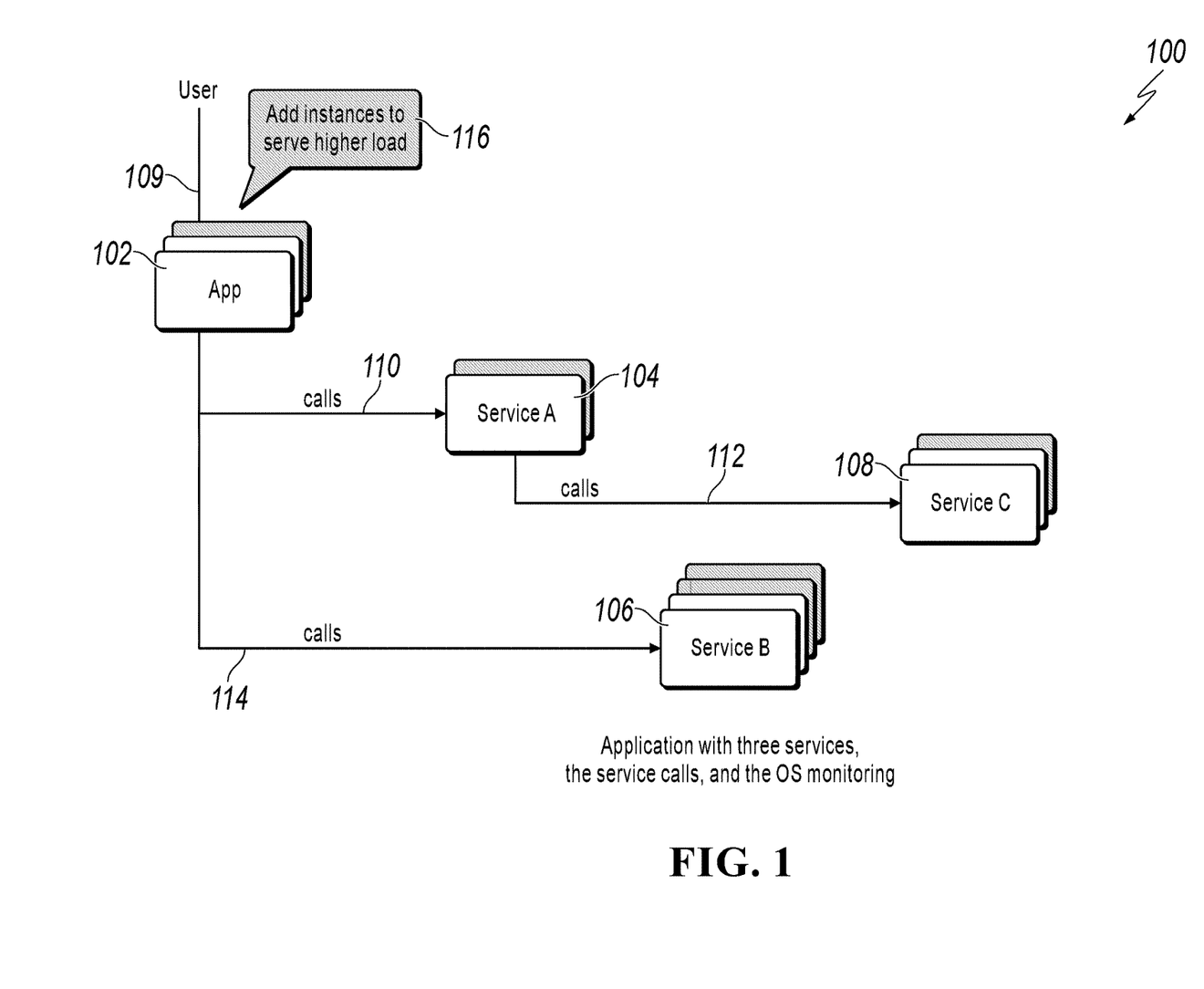
FIG. 1 is a block diagram illustrating an example application with three services, application/service calls, and an OS monitoring infrastructure in a microservices architecture, according to an implementation of the present disclosure.

FIG. 1 is a block diagram 100 illustrating an example application (App) 102 with three services (Services 104, 106, and 108), application/service calls (calls 109/110, 112, and 114, respectively), and an OS monitoring infrastructure 116 in a microservices architecture, according to an implementation of the present disclosure. For example, as soon as there are more application instances (Apps 102) are instantiated by a call 109, the additional application instances send more requests to services (for example, Service A 104 and Service B 106), which increases overall load on the services. This situation is detected by the OS monitoring infrastructure 116 at a defined time-interval (for example, once a minute). At the next point-in-time for measurement of OS parameters, a scaler component triggers a scaling of the services detected to be under high-load (here, for example, Service A 104). As soon as the services are scaled, the services (Service A 108) will send service requests (that is, calls 112) to a next level of needed services (here, for example, Service C 108, as Service B 106 does not have a need to call additional services). The sending of service requests to the next level of needed services is again detected by the OS monitoring infrastructure 116 at the defined time-interval. Again, at the next point-in-time for measurement of the OS parameters, the scaler component will trigger a scaling of the next level services (Service C 108) now detected to be under a high-load.

Figure 2:
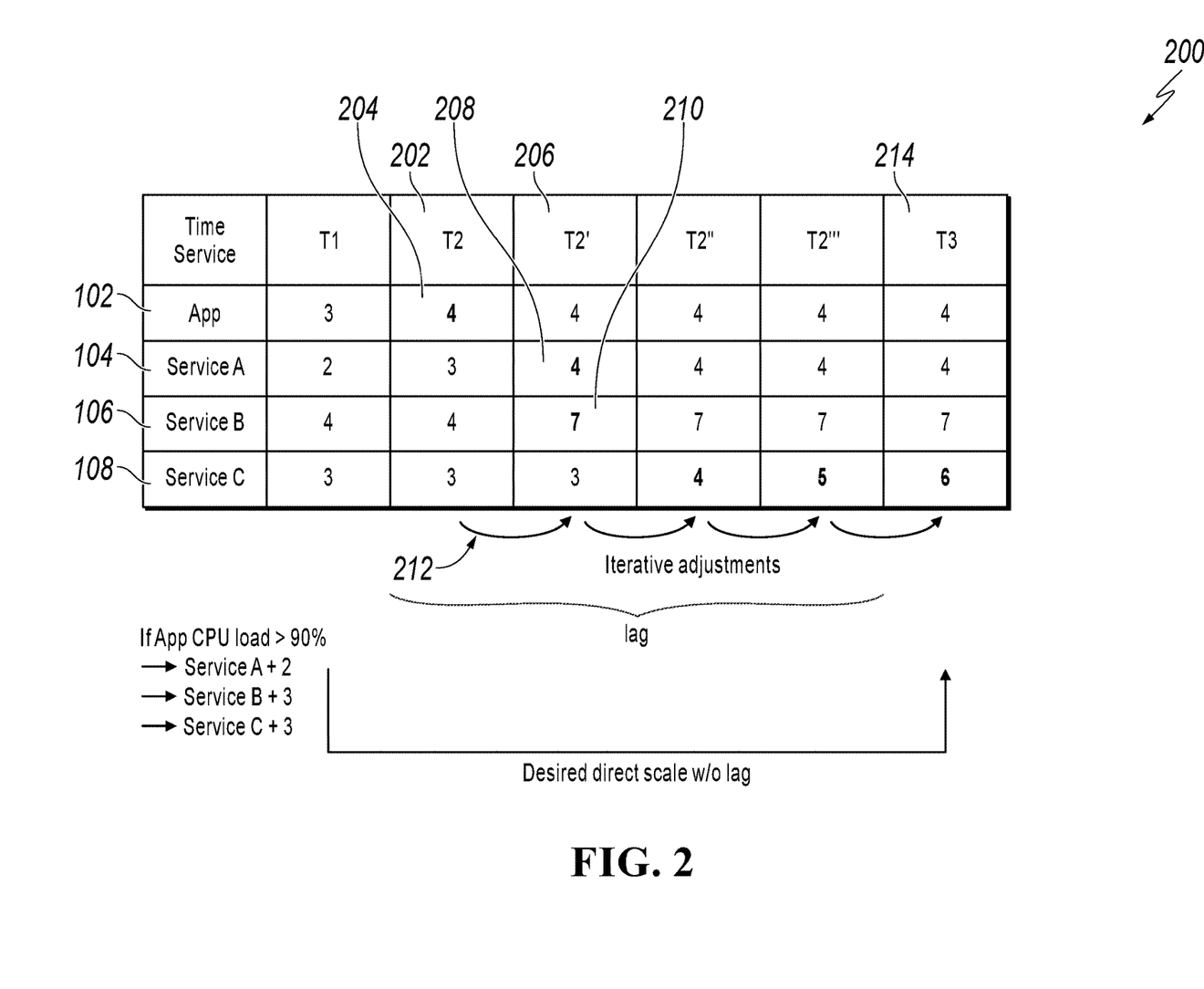
FIG. 2 is a block diagram illustrating a number of instances per service at different points in time with respect to in the microservices architecture of FIG. 1, according to an implementation of the present disclosure.

Turning to FIG. 2, FIG. 2 is a block diagram 200 illustrating a number of instances per service at different points in time with respect to in the microservices architecture of FIG. 1, according to an implementation of the present disclosure. For example, at time T2 202, the number of instances 204 of the App 102 increases to 4, however it is not until time T2' 206 that the number of instances 208 of Service A 104 increases to 4 and the number of instances 210 of Service B 106 increases to 7. In some implementations with a constant defined time-interval (for example, once a minute), the iterative adjustments 212 each take 1 minute and to get to the desired scaling for App 102, Service A 104, Service B 106, and Service C 108 scaling illustrated at T3 214 (respectively, 4, 4, 7, and 6) would require up to five minutes of scaler iterations. As a result, the associated service mesh reacts slowly on changes in load and users can experience bad response times for a relatively-long period of time. Likewise, once load is reduced, resources remain overprovisioned for an unnecessary amount of time, creating avoidable cost. In contrast, the improved auto-scaling methodology could detect the change at T1 and calculate the eventual needed scaling without intermediate iterations—effectively, jumping from T1 to T3.

Figure 3:
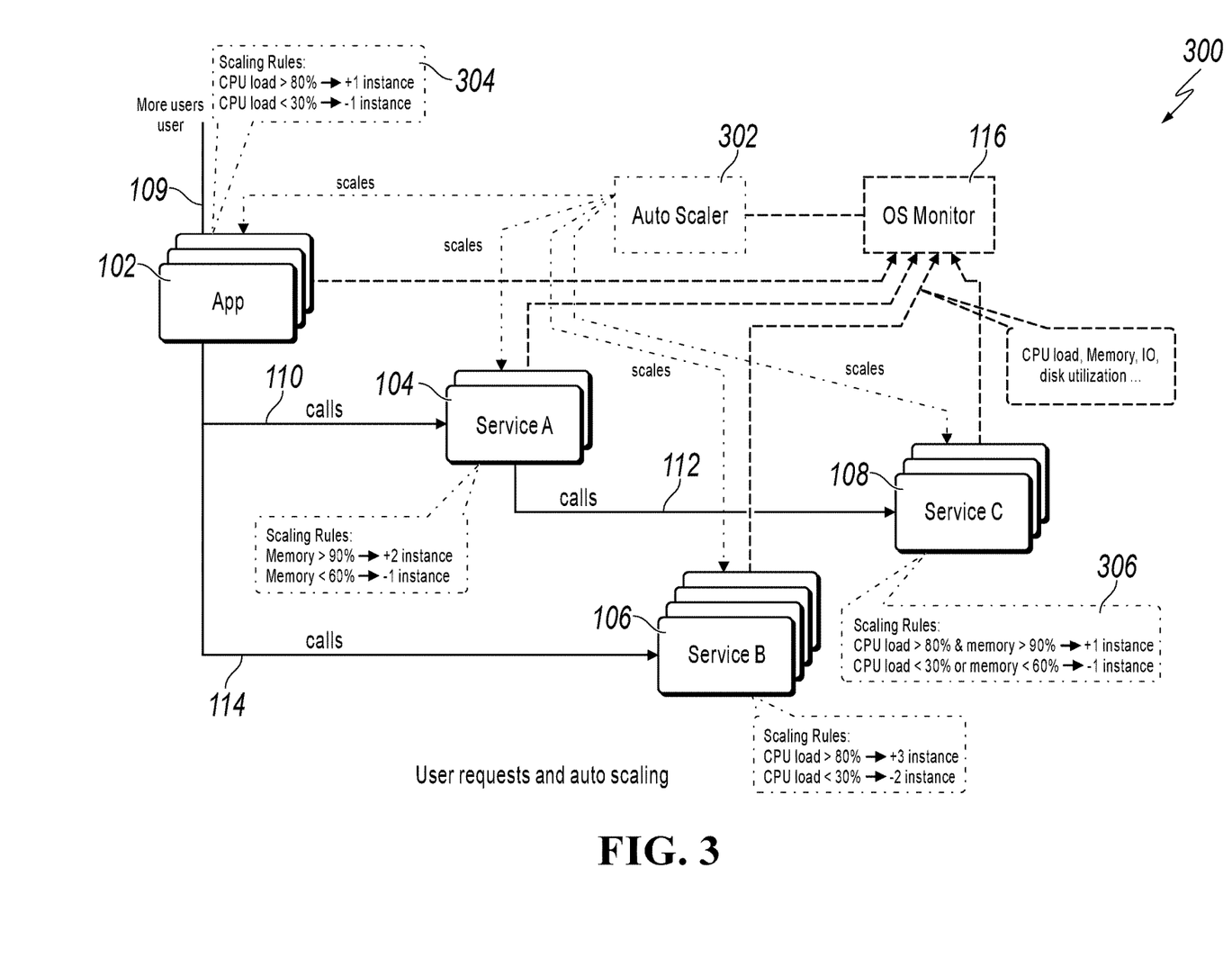
FIG. 3 is a block diagram illustrating the use of a conventional scaler and OS monitoring infrastructure with respect to the microservices architecture of FIGS. 1 and 2, according to an implementation of the present disclosure.

FIG. 3 is a block diagram 300 illustrating the use of a conventional scaler 302 and OS monitoring infrastructure (OS Monitor 116) with respect to the microservices architecture of FIGS. 1 and 2, according to an implementation of the present disclosure. For example, as illustrated in FIG. 3, scaler 302 is configured to work with OS Monitor 116 and one or more scaling rules (such as scaling rules 304 or 306) to scale App 102, Service A 104, Service B 106, and Service C 108 when calls (for example, calls 109, 110, 112, and 114) are made to instantiate instances the App 102, Service A 104, Service B 106, or Service C 108.

Since lag is faced in conventional scale-out in meshes and there is a desire to ensure fast response times, two options are typically available:
  a) Overprovisioning to ensure fast response time, or
  b) Tight provisioning to ensure low costs.

Here the described improved monitoring and scaling-infrastructure would both reduce costs (with respect to overprovisioning) and improve on response times (with respect to tight provisioning). Accordingly, the improved monitoring and scaling-infrastructure would not cause additional load on the systems.

To address inefficiencies with respect to time and CPU load/memory usage, at a high-level, a two-fold improvement to the previously described auto-scaling process is proposed. First, a scaler can be configured to: 1) compute a change in a number of instances as a function of a current number of instances and not only by percentage or a fixed number (a single-service, Quantity-Aware Scaler) and 2) configured to compute a change in the number of instances as a function of a load parameter change and not only the load parameter value (extending the single-service, Quantity-Aware Scaler to be a single-service, derivative-change-aware scaler). Second, an scaler can be configured to: 1) monitor an application and to scale all dependent services (a mesh scaler) and 2) monitor a request to one application and to scale the required mesh of dependent services based on the request type by computing a change in a number of instances of services depending on the request type (a request-type-aware mesh scaler).

At a high-level, the improved auto-scaling functionality can provide the following advantages/functions over conventional scaler functionality:

Single-Service-Type Scalers

1. Single-Service, Auto-Service Scaler
   Calls a monitoring infrastructure for new values of all containers every x seconds, identifies the sets of containers running the same services or applications, and for each set of containers running the same service or application, triggers creation/destruction of application/service instances based on computations performed on monitoring parameters.
2. Single-Service, Quantity-Aware Scaler
   If there are non-linear effects in scaling a service, the quantity-aware scaler can be used to adjust the non-linear effects.
3. Single-Service, Derivative-Change-Aware Scaler:
   If a number of instances for a certain service is varying up and down and "swinging" around some value, this scaler can be used to damped the swinging effects, and
   If a load varies quickly on large scale, scaling needs to be accelerated. If a large change is detected, this scaler can detect a fast change and trigger an accelerated scaling.

Mesh-Type Scalers

1. Mesh Scaler
   For "deep" call stacks of services, lag in scaling can become increasingly problematic. This scaler can be used to remove the lag.
2. Request-Type-Aware Mesh Scaler:
   If a call request triggers very different actions and calls to different dependent services, this scaler can be used to react specifically for different request types.
   Identifies a call distribution and whether the call distribution is statistically distributed over all usage types or systematically favoring one or the other usage types.
   Large number of users typically behave statistically.
   Users triggered by events (for example, Monday morning, Black Friday, e-mail campaigns, or TWITTER tweets) behave systematically similar.
   If the identified distribution is systematically similar (and not random), use this scaler as it can be parametrized to reflect the systematic differences.

In more detail, with respect to single-service scalers, for an auto-service scaler, "container" is used as a synonym for host, VM, container, depending on an infrastructure configuration. "Load" is defined as a relative consumption of the available resource capacity (for example, CPU or memory). In some implementations, the load of one service instance is considered to be between 0 and 1.

For the purposes of this disclosure, "auto-scaler infrastructure" (ASI) is defined as:
The ASI can read monitoring parameters from a monitoring infrastructure of containers, the containers running instances of services.
   Aggregating the deployment wide (for example, data center (DC) and tenant in an infrastructure) system load of the containers the services run in.
   Per instance, collecting the load.
   Summing the load over all available instances and calculating an average load.
The ASI centrally stores:
   A list of services and the number of instances of each service.
   A mapping of service instance to container (to allow mapping the monitoring parameters to a service instance).
   for each service, a scaling rule depending on the monitoring parameters.
The ASI triggers:
   A create (n) instance(s) of a certain service, if the scaling rule of the service applied for the measured monitoring parameters returns a scale-out event.
   A stop (n) instances of a certain service, if the scaling rule of the service applied for the measured monitoring parameters returns a scale-in event.
In some implementations, the ASI process includes:
The ASI calling the monitoring infrastructure for new values of all containers every x seconds.
The ASI identifies the sets of containers running the same services or applications.
For each set of containers running the same service or application, the ASI:
   Computes the average (or median, or maximum or another function) of the monitoring parameters.
   Computes the scaling rule value, depending on the monitoring parameters (previous step).
   Triggers creating/destroying instances depending on the result of the previous step.
The ASI reads monitoring parameters again according to particular intervals.

In some implementations, the ASI is a function of c=load of the resource used by the instances (for example, CPU or memory), where ASI=f(c).

Quantity-Aware Scaler

Quantity-aware scaling is an extension of the auto-service scaler. A function computing a number of new instances is additionally dependent on a number of instances already running ($i_s$=# of instances of service s), where $ASI_Q$=f(c, $i_s$). With this additional parameter, additional effects can be taken into account, such as:
   There is a minimum number of instances required to guarantee high availability SLAs,
   Scaling for a small number of instances follows different rules than for a very large number of instances.
In some implementations, the quantity-aware scaler can take non-linear effects in scaling into account. The non-linear effects can be determined by measuring service scaling. A reason can be an architecture that is not linearly scalable (for example, needs more than double a number of instances for double the load).

Most importantly, the quantity-aware scaler is a first iteration of addressing scaling latency: If a large number of instances hits a load threshold, then adding just one additional instance has very little effect on reducing an overall load on the service. As scaling up the one instance happens with a delay, scaling one-by-one may be too slow for a service with many instances. Therefore, the quantity-aware scaler increases a number of service instances in larger increments when there are already more instances running currently that all experience a higher load.

Derivative-Change-Aware Scaler

A scaler, which takes into account not only a load, but also a speed of load change (that is, a derivative of the load with respect to time) can be used to accelerate or dampen scaling depending on a change speed:

$ASI_D = f(c, c')$, with $c' = dc/dt$

A number of new instances is computed not only using OS monitoring infrastructure parameter values, but also a derivative of the monitoring parameters (that is, their change rate). For example, a fast increase in CPU load indicates a faster growth in usage and requires a faster scale-out. Amplifying the scaling can be configured with a derivative-change-aware scaler.

In some implementations, the CPU load used as a parameter that is evaluated by monitoring is typically a load average over a last x seconds (or minutes) (meaning that it is a moving average). As a result, a change in CPU load is measured in a "moving average CPU load" with a delay. Using the CPU load without averaging would trigger scaling events also for short peak usage changes. To compensate for the delay due to the moving average, the derivative-change-aware scaler can be used to accelerate the change during the initial load increase.

Parametrized differently, the derivative-change-aware scaler can dampen changes. The set of instances has a certain "inertia": the instances will take time to start up, so there is delay between a scaling action and a resulting higher capacity. Instances may also run effectively only after a certain period of time (for example, fill caches or get used services scaled-up). If during this period—due to still insufficient capacity—the load is still above a threshold to trigger scale-out, the derivative-change-aware scaler will start more instances, the service mesh will (after a certain period of time) have too much capacity. Then the derivative-change-aware scaler will stop instances, but this action may also will be delayed, as the instances will typically be shut down "gracefully" to allow completion of running actions (that is, not all executed actions will be terminated after milliseconds). As a result, scale-in also acts with "inertia".

Additional instances typically also do not only increase capacity for "one more call", but instances can handle several calls in parallel (depending on the service type). In these cases, adding one instance can provide overhead in capacity and CPU load afterwards remains low.

The depth of a service mesh (that is, the call-stack of services calling services) can also add "inertia" to the system. The deeper the mesh, the longer it will take to react to changed request numbers.

For a single-service scaler, the scale is:

$ASI_{DQ} = f(c, c', i_s)$,

A target number of instances required ($I_s$) is delivered,

The target number is given to the microservices infrastructure to adjust the number of running instances to the target number, and where:

$f(c, c', i_s) = k_1 * f_1(c, i_s) + k_2 * f_2(c', i_s)$, and for $k_2 < 0$, the change is "damped", for $k_2 > 0$ it is accelerated.

Mesh Scaler

For the purposes of this disclosure, a "Mesh Scaler Infrastructure" (MSI) is defined as: (where modifications compared to the ASI are indicated with an '*'):

The MSI can read monitoring parameters from a monitoring infrastructure of containers, the containers running instances (* of an application).

The MSI centrally stores:
  A list of services and the number of instances of each service.
  A mapping of service instance to container.
    A list of applications and the number of instances of each application.
    For each application and service, the list of other services used.
    For each application a scaling rule of the application and all directly or indirectly used services (that is, services called by called services) depending on the monitoring parameters.
      The scaling rule is defined by an application developer.
      The scaling rule is based on load tests that provide a static picture of relations of a number of instances between application and services per type.

The MSI triggers
  A create/stop (n) instances of an application, including a create/stop
  (n) instances of each called service (and services called by services), if the scaling rule of the application applied for the measured monitoring parameters returns a scale-out/scale-in event.

In some implementations, therefore:

$MSI = f_m(c_a)$, where $c_a$ is a load of the application.

MSI delivers a vector: $V = (I_1, I_2 \ldots I_n)$, where $I_i$, the number of instances of each service type required.

*or*

MSI delivers a vector: $V = (D_1, D_2 \ldots D_n)$, where $D_i$ is a demand to the service type i. The demand is passed to the single service scalers $ASI_i$.

Demand is a relative measure (for example, a service mesh has been measured and sized for a certain request frequency (say 100/s), the app thus has demand 100. Depending on the services used, the 100 incoming requests are triggering $R_i$ requests to the services $s_i$).

For example, 100 calls to app, 80 calls to s1, 200 calls to s2.

Thus: $D_1 = 80$, $D_2 = 200$.

The scaler for $s_1$ is initially sized to handle 80 requests with $I_1$ instances (say 4).

If the demand goes to 160, the scaler would compute say 8 instances.

The mesh scaler is therefore configured with the set of services it calls: $s_i$ and the weight the services are $w_i$.

The mesh scaler is initially sized for x requests/second. The actual requests are y requests/second. Demand $D_a$ to the app is therefore: y/x=actual requests/initial sizing.

The demand to the services $s_i$ is then: $D_i = w_i * D_a$.

In some implementations, the definition of the application and which services are used by the application is defined in a "Multi Target Application" definition—a concept to describe applications composed out of a set of services, where:

$A_j=(s_1, s_2 \ldots s_n)$.

In some implementations, therefore:

$MSI(a)=f_m(c_a)$, where:
  a is the application
  $c_a$ is the load of the application.

MSI outputs $V=(D_1, D_2 \ldots D_n)$ $ASI(s)=f(c_s, c_s', i_s, D_s)$, where:
  s is the service,
  $c_s$ is the load of the service,
  $c_s'$ is the derivative of the service with respect to time,
  $i_s$ is the number of instances of service s, and
  $D_s$ is the demand defined by MSI.

ASI(s) outputs $I_s$ the number of instances required for service s

Request-Type-Aware Mesh Scaler

The request-type aware mesh scaler defines usage of dependent services depending on a request type of the application. For example:

The application has a "create account/address", "create order", "print return form" application service order.

If the user calls the "create account", the address service will be called, but not the PDF generator.

If the user calls the "print return form", the PDF generator is called.

Therefore, knowing the request to the application (for example, create account vs. print return form) allows scaling of the services which are actually called and not all, (such as, the PDF generator service).

In some implementations, "Request-Type-Aware Mesh Scaler Infrastructure" (RMSI) is defined as: (modifications compared to the MSI are indicated with an '*')

The RMSI can read monitoring parameters from a monitoring infrastructure of containers, the containers running instances of services.

The RMSI centrally stores:
  A list of services and the number of instances of each service.
  A mapping of service instance to container.
  A list of applications and the number of instances of each application.
  For each application and service, the list of other services called, (* each service called attributed with a list of usage types).
  For each application a scaling rule of the application and all called services (and services called by called services and so on) depending on the monitoring parameters (* and usage type).
    The scaling rule is initially defined by the application developer
    It is computed out of the scaling rules of the service types (????)
    It can be replaced by a trained model (machine learning).

The RMSI can:
  Read monitoring parameters from incoming requests,
  Determine the usage type
  Store for each usage type the number of calls in a period (for example, the last 5 minutes).

The RMSI can:
  Compute a weighted scaling event,
    The scaling rule is applied for each usage type, the result is multiplied by the number of calls stored.
    The result is divided by the total number of calls stored.

The RMSI:
  Triggers a create/stop (n) instances of an application, including a create/stop (n) instances of each called service (and services called by services), if the scaling rule of the application applied for the measured monitoring parameters returns a scale-out/scale-in event.

In some implementations, the RMSI process includes:
  The RMSI calls the monitoring infrastructure for new values of all containers every x seconds.
  The RMSI calls the monitoring infrastructure for the list of new calls and computes their usage type.
  The RMSI identifies the sets of containers running the same application.
  For this set of containers running the same application, the RMSI:
    Computes the average (or median, or maximum or another function) of the monitoring parameters.
    Computes the scaling rule value, depending on the monitoring parameters (previous step), the usage type information and weights the scaling depending on the usage type weight.
    Triggers creating/destroying instances of the application and the called services depending on the result of the previous step.
  The RMSI reading monitoring parameters again.

In some implementations, therefore:

$MSI(a)=f_m(c_a, R_a)$, where:
  a is the application
  $c_a$ is the load of the application.
  $R_a$ is a vector $(R_1, R_2, \ldots R_m)$ with the number of request types $R_j$ per second.
  For each request type a demand can be computed/defined: $D_{ji}$
    $D_{1i}=(D_{11}, \ldots D_{1n})$ the demand to the services for request type 1.
    $D_{2i}=(D_{21} \ldots D_{2n})$, the demand to the services for request type 2.
    . . . .
    $D_{i1}=(D_{11}, \ldots D_{n1})$ is the demand to service I of the different request types.

The demand for a certain service is then passed to the ASI: $ASI_j (D_{ij})$.

In some implementations, the Mesh Scaler is combined with the Auto Service Scaler. The MSI will scale a complete mesh with a single triggering action, but the load on the individual services may depend on parameters not reflected in the actually used mesh scaling rules. Therefore, the ASI is used to fine-tune the capacity for an individual service. In some cases, the orchestration of the MSI and the ASI can be implemented as a closed-loop control circuit.

Table 1 represents an example of calculations performed by the improved methodology:

TABLE 1

| CPU LOAD | 50% | 60% | 70% | 80% | 90% |
|---|---|---|---|---|---|
| MSI: | +20% | +30% | +0% | −10% | −20% |
| =: | 60% | 78% | 70% | 72% | 72% |

CPU load multiplied by a MSI prediction:
  If load>threshold→scale,
  If load~threshold→stay, or
  If load<threshold→downscale.

In an example, a mesh scaler performs overall (coarse-grained/low-granularity) mesh-wide scaling, whereas a single-service scaler is used for fine-tuning the scaling of each individual service to improve the mesh scaler scaling. As a particular example, one possible way of combining the two types of scalers is as follows:

A load change predicted by the mesh scaler is multiplied by the actual load measured by the single-service scaler to determine the target load that is used to determine scaling needs. For example, if the mesh scaler predicts a load increase of +20% for a specific service in the mesh and the single-service scaler for the service measures a current load of 50% then the target load is calculated as 50%*120%=60% (120 because you start with 100 and increase by 20 so it is 120).

Now the target value of 60% can be compared against a defined threshold to determine if any scaling is needed. With an example threshold of 70%, there is not yet a need to scale with the described calculation. However, if the calculation was not performed as described, and the mesh scaler prediction was simply added, then the threshold would have been reached (that is, 50%+20%=70%)–triggering a scale-up. The more complex calculation is recommended because the mesh scaler measurement might be too coarse when compared to the actual measured load). As a result, the recommended calculation compensates for the mesh scaler's "ignorance" by factoring in the current load (that is, 50%).

The other numbers are similar: a 60% load measured by a single-service scaler+30% predicted increase by a mesh scaler means 60%*130%=78%. Or the last number with a negative prediction: 90% measured and −20% prediction means 90%*80%=72% (80 because 100−200).

Figure 4:
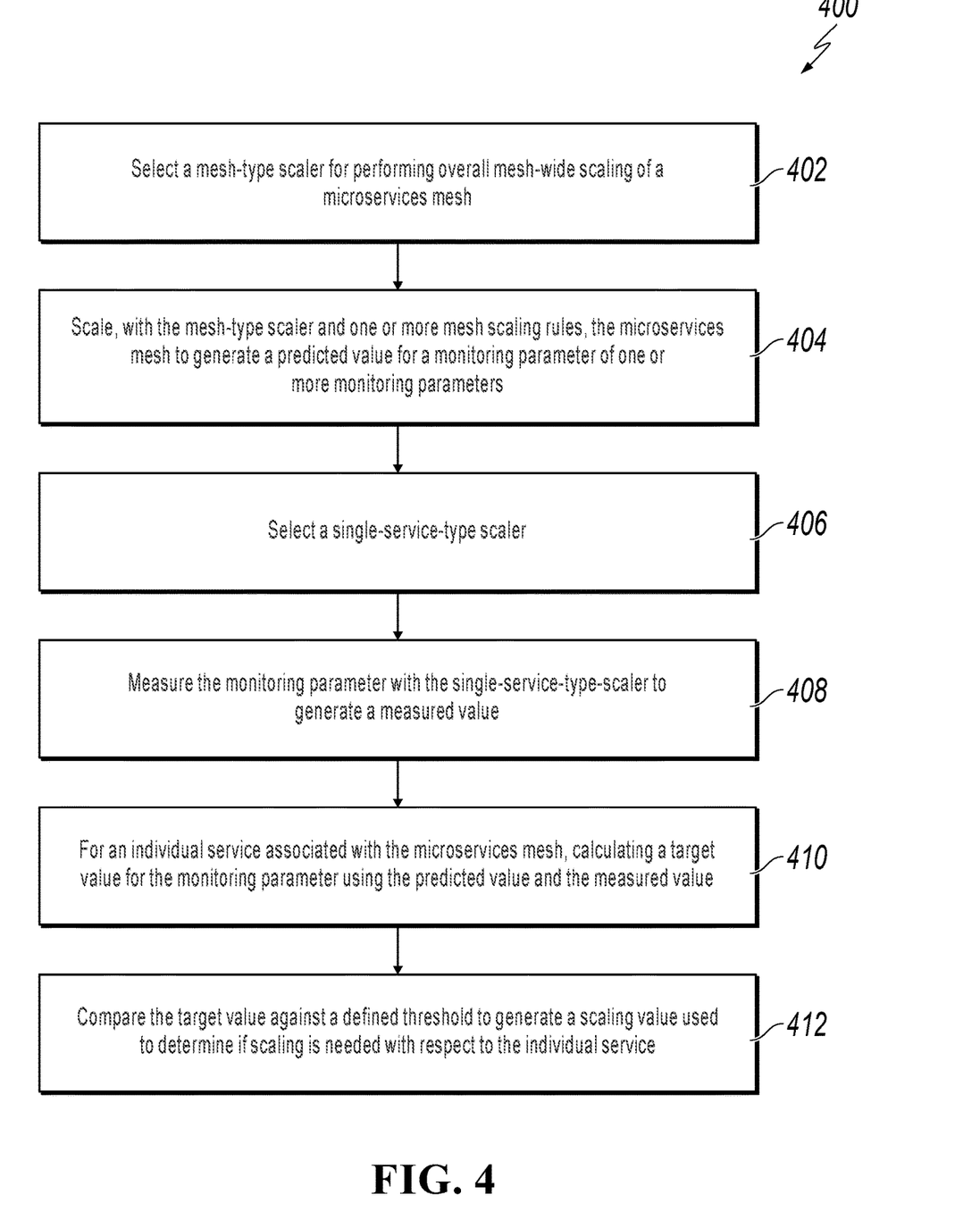
FIG. 4 is a flowchart illustrating an example of a computer-implemented method for amplifying scaling elasticity of microservice meshes, according to an implementation of the present disclosure.

FIG. 4 is a flowchart illustrating an example of a computer-implemented method 400 for amplifying scaling elasticity of microservice meshes, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a mesh-type scaler is selected for performing overall mesh-wide scaling of a microservices mesh. In some implementations, the mesh-type scaler includes a mesh scaler and a request-type-aware mesh scaler. From 402, method 400 proceeds to 404.

At 404, the microservices mesh is scaled with the mesh-type scaler and one or more mesh scaling rules to generate a predicted value for a monitoring parameter of one or more monitoring parameters. In some implementations, the scaling of the microservices mesh with the mesh-type scaler is performed in a single triggering action. From 404, method 400 proceeds to 406.

At 406, a single-service-type scaler is selected. In some implementations, the single-service-type scaler includes an auto-service scaler, quantity-aware scaler, and derivative-change-aware scaler. In some implementations, the mesh-type scaler passes the predicted value to the single-service-type scaler. From 406, method 400 proceeds to 408.

At 408, the monitoring parameter is measured with the single-service-type-scaler to generate a measured value. From 408, method 400 proceeds to 410.

At 410, for an individual service associated with the microservices mesh, a target value is calculated for the monitoring parameter using the predicted value and the measured value. From 410, method 400 proceeds to 412.

At 412, the target value is compared against a defined threshold to generate a scaling value used to determine if scaling is needed with respect to the individual service. In some implementations, the single-service-type scaler: reads monitoring parameters from a monitoring infrastructure of containers executing instances of services; aggregates a system load of the containers the instances of the services execute in; collects the load per service instance; and calculates an average load by summing the load over all available service instances. In some implementations, the single-service-type scaler triggers creation or destruction of instances of the individual service depending on the scaling value. After 412, method 400 can stop.

Figure 5:
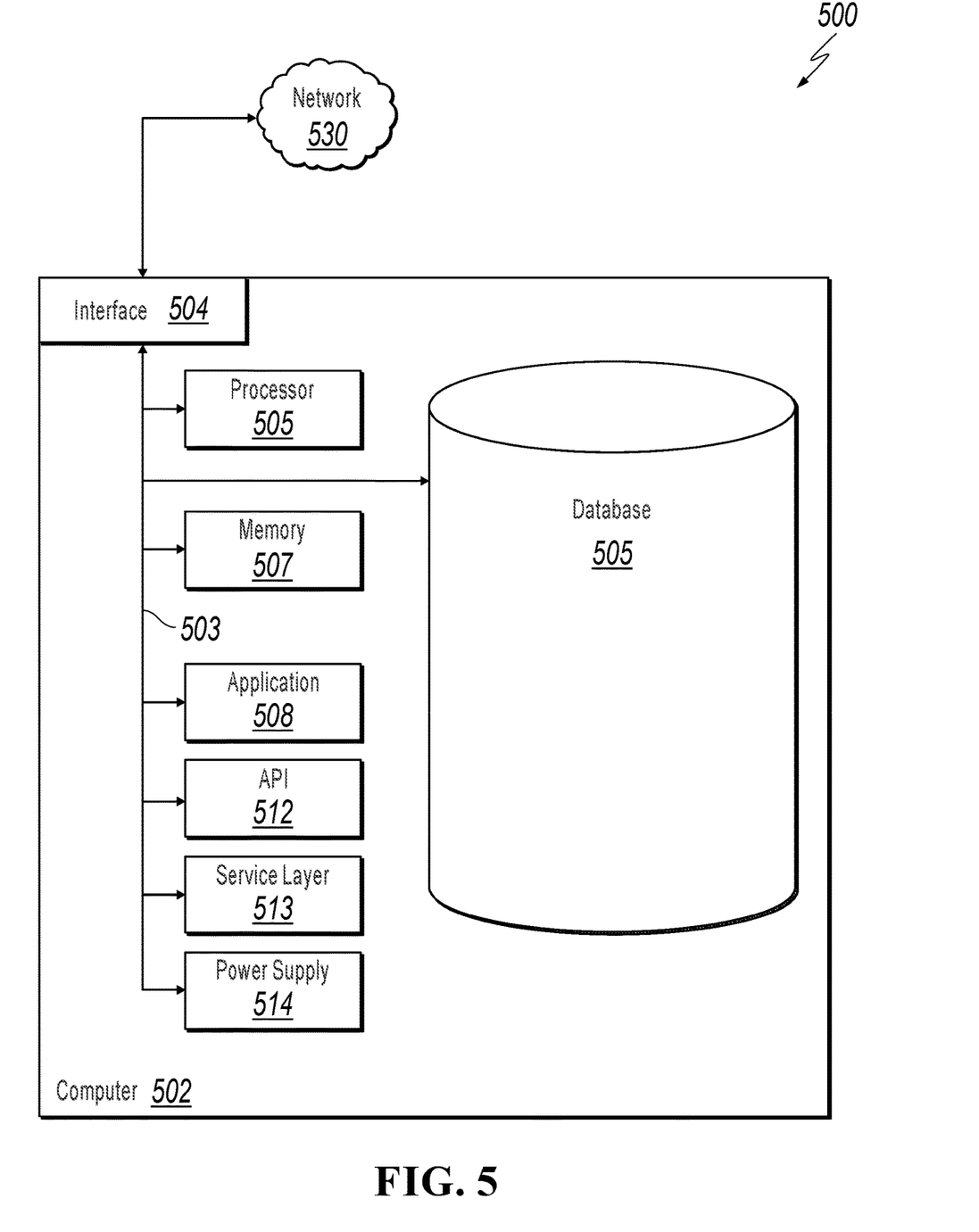
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud-computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: selecting a mesh-type scaler for performing overall mesh-wide scaling of a microservices mesh; scaling, with the mesh-type scaler and one or more mesh scaling rules, the microservices mesh to generate a predicted value for a monitoring parameter of one or more monitoring parameters; selecting a single-service-type scaler; measuring the monitoring parameter with the single-service-type-scaler to generate a measured value; for an individual service associated with the microservices mesh, calculating a target value for the monitoring parameter using the predicted value and the measured value; comparing the target value against a defined threshold to generate a scaling value used to determine if scaling is needed with respect to the individual service.

The foregoing and other described implementations can each, optionally, include one or more of the following features:

A first feature, combinable with any of the following features, wherein the mesh-type scaler includes a mesh scaler and a request-type-aware mesh scaler.

A second feature, combinable with any of the previous or following features, wherein the scaling of the microservices mesh with the mesh-type scaler is performed in a single triggering action.

A third feature, combinable with any of the previous or following features, wherein the single-service-type scaler includes an auto-service scaler, quantity-aware scaler, and derivative-change-aware scaler.

A fourth feature, combinable with any of the previous or following features, wherein the mesh-type scaler passes the predicted value to the single-service-type scaler.

A fifth feature, combinable with any of the previous or following features, wherein the single-service-type scaler: reads monitoring parameters from a monitoring infrastructure of containers executing instances of services; aggregates a system load of the containers the instances of the services execute in; collects the load per service instance; and calculates an average load by summing the load over all available service instances.

A sixth feature, combinable with any of the previous or following features, wherein the single-service-type scaler triggers creation or destruction of instances of the individual service depending on the scaling value.

In a second implementation, a non-transitory, computer-readable medium storing one or more instructions executable by a computer system to perform operations comprising: selecting a mesh-type scaler for performing overall mesh-wide scaling of a microservices mesh; scaling, with the mesh-type scaler and one or more mesh scaling rules, the microservices mesh to generate a predicted value for a monitoring parameter of one or more monitoring parameters; selecting a single-service-type scaler; measuring the monitoring parameter with the single-service-type-scaler to generate a measured value; for an individual service associated with the microservices mesh, calculating a target value for the monitoring parameter using the predicted value and the measured value; comparing the target value against a defined threshold to generate a scaling value used to determine if scaling is needed with respect to the individual service.

The foregoing and other described implementations can each, optionally, include one or more of the following features:

A first feature, combinable with any of the following features, wherein the mesh-type scaler includes a mesh scaler and a request-type-aware mesh scaler.

A second feature, combinable with any of the previous or following features, wherein the scaling of the microservices mesh with the mesh-type scaler is performed in a single triggering action.

A third feature, combinable with any of the previous or following features, wherein the single-service-type scaler includes an auto-service scaler, quantity-aware scaler, and derivative-change-aware scaler.

A fourth feature, combinable with any of the previous or following features, wherein the mesh-type scaler passes the predicted value to the single-service-type scaler.

A fifth feature, combinable with any of the previous or following features, wherein the single-service-type scaler: reads monitoring parameters from a monitoring infrastructure of containers executing instances of services; aggregates a system load of the containers the instances of the services execute in; collects the load per service instance; and calculates an average load by summing the load over all available service instances.

A sixth feature, combinable with any of the previous or following features, wherein the single-service-type scaler triggers creation or destruction of instances of the individual service depending on the scaling value.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: selecting a mesh-type scaler for performing overall mesh-wide scaling of a microservices mesh; scaling, with the mesh-type scaler and one or more mesh scaling rules, the microservices mesh to generate a predicted value for a monitoring parameter of one or more monitoring parameters; selecting a single-service-type scaler; measuring the monitoring parameter with the single-service-type-scaler to generate a measured value; for an individual service associated with the microservices mesh, calculating a target value for the monitoring parameter using the predicted value and the measured value; comparing the target value against a defined threshold to generate a scaling value used to determine if scaling is needed with respect to the individual service.

The foregoing and other described implementations can each, optionally, include one or more of the following features:

A first feature, combinable with any of the following features, wherein the mesh-type scaler includes a mesh scaler and a request-type-aware mesh scaler.

A second feature, combinable with any of the previous or following features, wherein the scaling of the microservices mesh with the mesh-type scaler is performed in a single triggering action.

A third feature, combinable with any of the previous or following features, wherein the single-service-type scaler includes an auto-service scaler, quantity-aware scaler, and derivative-change-aware scaler.

A fourth feature, combinable with any of the previous or following features, wherein the mesh-type scaler passes the predicted value to the single-service-type scaler.

A fifth feature, combinable with any of the previous or following features, wherein the single-service-type scaler: reads monitoring parameters from a monitoring infrastructure of containers executing instances of services; aggregates a system load of the containers the instances of the services execute in; collects the load per service instance; and calculates an average load by summing the load over all available service instances.

A sixth feature, combinable with any of the previous or following features, wherein the single-service-type scaler triggers creation or destruction of instances of the individual service depending on the scaling value.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   selecting a mesh-type scaler for performing overall mesh-wide scaling of a microservices mesh;
   scaling, with the mesh-type scaler and one or more mesh scaling rules, the microservices mesh to generate a predicted value for a monitoring parameter of one or more monitoring parameters;
   selecting a single-service-type scaler;
   measuring the monitoring parameter with the single-service-type scaler to generate a measured value;
   measuring a change rate of the monitoring parameter with a derivative-change-aware scaler to generate a measured change rate value, wherein the single-service-type scaler includes the derivative-change-aware scaler;
   for an individual service associated with the microservices mesh, calculating a target value for the monitoring parameter using the predicted value, the measured value, and the measured change rate value, wherein the measured change rate value is a derivative of the measured value of the monitoring parameter with respect to time and accelerates or dampens scaling depending on the measured change rate value; and
   comparing the target value against a defined threshold to generate a scaling value used to determine if scaling is needed with respect to the individual service.

2. The computer-implemented method of claim 1, wherein the mesh-type scaler includes a mesh scaler and a request-type-aware mesh scaler.

3. The computer-implemented method of claim 1, wherein the scaling of the microservices mesh with the mesh-type scaler is performed in a single triggering action.

4. The computer-implemented method of claim 1, wherein the single-service-type scaler includes an auto-service scaler and a quantity-aware scaler.

5. The computer-implemented method of claim 1, wherein the mesh-type scaler passes the predicted value to the single-service-type scaler.

6. The computer-implemented method of claim 1, wherein the single-service-type scaler:
   reads monitoring parameters from a monitoring infrastructure of containers executing instances of services;
   aggregates a system load of the containers the instances of the services execute in;
   collects the system load per service instance; and
   calculates an average load by summing the system load over all available service instances.

7. The computer-implemented method of claim 1, wherein the single-service-type scaler triggers creation or destruction of instances of the individual service depending on the scaling value.

8. A non-transitory, computer-readable medium storing one or more instructions executable by a computer system to perform operations comprising:
   selecting a mesh-type scaler for performing overall mesh-wide scaling of a microservices mesh;
   scaling, with the mesh-type scaler and one or more mesh scaling rules, the microservices mesh to generate a predicted value for a monitoring parameter of one or more monitoring parameters;
   selecting a single-service-type scaler;
   measuring the monitoring parameter with the single-service-type scaler to generate a measured value;
   measuring a change rate of the monitoring parameter with a derivative-change-aware scaler to generate a measured change rate value, wherein the single-service-type scaler includes the derivative-change-aware scaler;
   for an individual service associated with the microservices mesh, calculating a target value for the monitoring parameter using the predicted value, the measured value, and the measured change rate value, wherein the measured change rate value is a derivative of the measured value of the monitoring parameter with respect to time and accelerates or dampens scaling depending on the measured change rate value; and
   comparing the target value against a defined threshold to generate a scaling value used to determine if scaling is needed with respect to the individual service.

9. The non-transitory, computer-readable medium of claim 8, wherein the mesh-type scaler includes a mesh scaler and a request-type-aware mesh scaler.

10. The non-transitory, computer-readable medium of claim 8, wherein the scaling of the microservices mesh with the mesh-type scaler is performed in a single triggering action.

11. The non-transitory, computer-readable medium of claim 8, wherein the single-service-type scaler includes an auto-service scaler and a quantity-aware scaler.

12. The non-transitory, computer-readable medium of claim 8, wherein the mesh-type scaler passes the predicted value to the single-service-type scaler.

13. The non-transitory, computer-readable medium of claim 8, wherein the single-service-type scaler:
    reads monitoring parameters from a monitoring infrastructure of containers executing instances of services;
    aggregates a system load of the containers the instances of the services execute in;
    collects the system load per service instance; and
    calculates an average load by summing the system load over all available service instances.

14. The non-transitory, computer-readable medium of claim 8, wherein the single-service-type scaler triggers creation or destruction of instances of the individual service depending on the scaling value.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    selecting a mesh-type scaler for performing overall mesh-wide scaling of a microservices mesh;
    scaling, with the mesh-type scaler and one or more mesh scaling rules, the microservices mesh to generate a predicted value for a monitoring parameter of one or more monitoring parameters;
    selecting a single-service-type scaler;
    measuring the monitoring parameter with the single-service-type scaler to generate a measured value;
    measuring a change rate of the monitoring parameter with a derivative-change-aware scaler to generate a measured change rate value, wherein the single-service-type scaler includes the derivative-change-aware scaler;

for an individual service associated with the microservices mesh, calculating a target value for the monitoring parameter using the predicted value, the measured value, and the measured change rate value, wherein the measured change rate value is a derivative of the measured value of the monitoring parameter with respect to time and accelerates or dampens scaling depending on the measured change rate value; and comparing the target value against a defined threshold to generate a scaling value used to determine if scaling is needed with respect to the individual service.

16. The computer-implemented system of claim 15, wherein the mesh-type scaler includes a mesh scaler and a request-type-aware mesh scaler.

17. The computer-implemented system of claim 15, wherein the scaling of the microservices mesh with the mesh-type scaler is performed in a single triggering action.

18. The computer-implemented system of claim 15, wherein the single-service-type scaler includes an auto-service scaler and a quantity-aware scaler.

19. The computer-implemented system of claim 15, wherein the mesh-type scaler passes the predicted value to the single-service-type scaler.

20. The computer-implemented system of claim 15, wherein the single-service-type scaler:
reads monitoring parameters from a monitoring infrastructure of containers executing instances of services;
aggregates a system load of the containers the instances of the services execute in;
collects the system load per service instance;
calculates an average load by summing the system load over all available service instances; and
triggers creation or destruction of instances of the individual service depending on the scaling value.

* * * * *